US008196110B2

(12) United States Patent
Cabrera Escandell et al.

(10) Patent No.: US 8,196,110 B2
(45) Date of Patent: Jun. 5, 2012

(54) METHOD AND APPARATUS FOR VERIFYING A SUSPECT RETURN POINTER IN A STACK

(75) Inventors: Marco A. Cabrera Escandell, Austin, TX (US); Tommy L. McLane, Hutto, TX (US); Elizabeth J. Murray, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1222 days.

(21) Appl. No.: 11/947,961

(22) Filed: Nov. 30, 2007

(65) Prior Publication Data

US 2009/0144309 A1 Jun. 4, 2009

(51) Int. Cl.
G06F 9/44 (2006.01)
G06F 9/45 (2006.01)
G06F 11/30 (2006.01)
H04L 29/06 (2006.01)

(52) U.S. Cl. ........ 717/126; 717/127; 717/141; 717/155; 713/166; 713/190; 713/193; 713/194; 726/22; 726/23; 726/24; 726/25

(58) Field of Classification Search .................. None
See application file for complete search history.

(56) References Cited

U.S. PATENT DOCUMENTS

| | | | |
|---|---|---|---|
| 6,226,746 B1 | 5/2001 | Scheifler | |
| 6,934,758 B2 | 8/2005 | Scheifler et al. | |
| 7,086,088 B2 * | 8/2006 | Narayanan | 726/22 |
| 7,272,748 B1 * | 9/2007 | Conover et al. | 714/20 |
| 7,581,089 B1 * | 8/2009 | White | 712/242 |
| 7,716,495 B2 * | 5/2010 | Shupak et al. | 713/193 |
| 7,793,349 B2 * | 9/2010 | Abrams | 726/23 |
| 7,971,255 B1 * | 6/2011 | Kc et al. | 726/24 |
| 2002/0112227 A1 * | 8/2002 | Kramskoy et al. | 717/148 |

(Continued)

OTHER PUBLICATIONS

H. Ozdoganoglu et al., "SmashGuard: A Hardware Solution to Prevent Attacks on the Function Return Address", Dec. 5, 2002, pp. 1-19.*

(Continued)

Primary Examiner — Isaac Tecklu
(74) Attorney, Agent, or Firm — Robert C. Rolnik; David A. Mims

(57) ABSTRACT

The present invention provides a computer implemented method, data processing system, and computer program product for verifying a return address. A computer stores the return address into a stack based on a function call. The computer generates a first hash based on a first stack frame and a second stack frame. The computer stores the first hash in a first canary location, wherein the first canary location is in the first stack frame. The computer executes at least one instruction of a routine referenced by the function call. The computer reads the first canary location to form a first suspect hash. The computer calculates a first verification hash based on the first stack frame and the second stack frame. The computer determines that the first verification hash matches the first suspect hash to form a first positive determination. The computer responsive to the first positive determination, the computer reads a second canary location to form a second suspect hash. The computer calculates a second verification hash based on the second stack frame. The computer determines that the second verification hash matches the second suspect hash to form a second positive determination. The computer responsive to the first positive determination and the second positive determination, the computer pops the return address off the stack. The computer executes at least one instruction at a memory location pointed to by the return address.

20 Claims, 4 Drawing Sheets

U.S. PATENT DOCUMENTS

| | | | |
|---|---|---|---|
| 2002/0144141 A1* | 10/2002 | Edwards et al. | 713/200 |
| 2003/0172293 A1* | 9/2003 | Johnson et al. | 713/200 |
| 2005/0198645 A1* | 9/2005 | Marr et al. | 719/310 |
| 2006/0031933 A1* | 2/2006 | Costa et al. | 726/22 |
| 2006/0107025 A1 | 5/2006 | Cypher | |
| 2006/0253837 A1 | 11/2006 | Hudson et al. | |
| 2006/0288342 A1* | 12/2006 | Hatlelid et al. | 717/168 |
| 2008/0060077 A1* | 3/2008 | Cowan et al. | 726/25 |
| 2008/0133858 A1* | 6/2008 | Enbody et al. | 711/163 |
| 2008/0148399 A1* | 6/2008 | Winkler | 726/22 |
| 2010/0011209 A1* | 1/2010 | Kiriansky et al. | 713/166 |

OTHER PUBLICATIONS

Stack-smashing protection; Wikipedia; Oct. 5, 2006; http://en.wikipedia.org/wiki/Stack-smashing_protection.

* cited by examiner

METHOD AND APPARATUS FOR VERIFYING A SUSPECT RETURN POINTER IN A STACK

BACKGROUND OF THE INVENTION

1. Field of the Invention

The present invention relates generally to a computer implemented method, data processing system, and computer program product for confirming correctness of data. More specifically, the present invention relates to verifying a return pointer in a stack frame prior to executing code referenced by a return pointer or return address.

2. Description of the Related Art

Writers of modern software build software functionality as a set of building blocks or modules. Typically, a software developer develops a specialized function or routine that can provide a known functionality according to a limited number of inputs. The software developer creates a general program that provides the inputs to the specialized function. The general program interacts with the specialized function by way of making a function call, thereby collecting results from the specialized function. The general program has the role of a calling function and the specialized function has the role of a called function, in this situation.

A data processing system manages function calls using a stack or last in first out (LIFO) data structure. A stack is a data structure to which data can be added by reference to a stack pointer and removed by reference to the stack pointer. A push instruction instructs a data processing system to add data to the top of the stack. Conversely, a pop instruction instructs the data processing system to remove data referenced by the stack pointer and place such data into a cache, such as one or more registers. For example, pushing data 'a', 'b', and 'c', to a stack places the data in an order where 'c' is at the top of the stack. Subsequent pops of the data remove the data in a reverse order of "c", "b", and then "a".

A use for stacks is organizing cooperating routines to exchange data and control information between the cooperating routines. Such a structure can permit a data processing system to manage multiple tiers of function calls. FIG. 2 shows an example of a stack as stack 200. The stack stores data in a series of stack frames, for example, top stack frame 220. A top stack frame is a frame that a stack pointer references. Top stack frame 220 includes data structures 221 used by the called program, a return address 225 to a called program, as well as a canary 223. Data structures include, for example, buffers. The return address and the canary are used to determine how a data processing system that executes the called function is to return to operating instructions of the calling function. A return address is a memory reference or pointer stored in a location in a stack. The return address holds a value that may directly point to code at a memory location. In other words, a location in memory is stored as the return address.

The return address identifies a next step to execute when a called function completes. However, the return address is vulnerable to corruption. The corruption occurs in the form of a buffer overrun. For example, a called function may solicit data input at a computer terminal and store the data within a string or buffer among the data structures 221. When the data processing system stores a string, it fills the data structure from top downwards, as shown in FIG. 2. For example, a data processing system allocates a string of the data structure 221 a length 16 bits. An input field is, for example, 32 bits. Without checking, the data processing system may write the 32 bits to occupy the initial 16 bits of the string, plus space beyond data structures 221. The data beyond data structures 221 is canary 223 and return address 225. Thus, when the called program completes, the return address 225 may execute an arbitrary memory instruction carried as a payload of the input field. Consequently, code execution may continue when the data processing system executes code referenced by the return address instead of the code at the correct memory location. For this reason, the return address, at or near completion of the called function is a suspect return address.

One scheme to assure correctness of the suspect return address includes placing a verifiable string between the return address and the data structures of the called function. A data processing system establishes the canary, for example, by creating a random number and storing it. The random number is exclusive ORed (XOR) with the return address to produce the canary. The data processing system places the canary between the buffers and the return address. An attack that overruns a buffer thus overwrites the canary. When the called program completes, the data processing system XORs the suspect return address with the random number and generates a verification canary. Unless an attacker can find the random number, the location of the return address and overwrites random number and return address to compensate for the changed canary, the verification canary cannot match the canary written by the attacker. The data processing system can stop execution in response to detecting a failed match between the suspect canary and the verification canary.

Unfortunately, skilled attackers can still determine the location of return address. In addition, random numbers can be guessed or otherwise become known.

SUMMARY OF THE INVENTION

The present invention provides a computer implemented method, data processing system, and computer program product for verifying a return address. A computer stores the return address into a stack based on a function call. The computer generates a first hash based on a first stack frame and a second stack frame. The computer stores the first hash in a first canary location, wherein the first canary location is in the first stack frame. The computer executes at least one instruction of a routine referenced by the function call. The computer reads the first canary location to form a first suspect hash. The computer calculates a first verification hash based on the first stack frame and the second stack frame. The computer determines that the first verification hash matches the first suspect hash to form a first positive determination. The computer responsive to the first positive determination, the computer reads a second canary location to form a second suspect hash. The computer calculates a second verification hash based on the second stack frame. The computer determines that the second verification hash matches the second suspect hash to form a second positive determination. The computer responsive to the first positive determination and the second positive determination, the computer pops the return address off the stack. The computer executes at least one instruction at a memory location pointed to by the return address.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
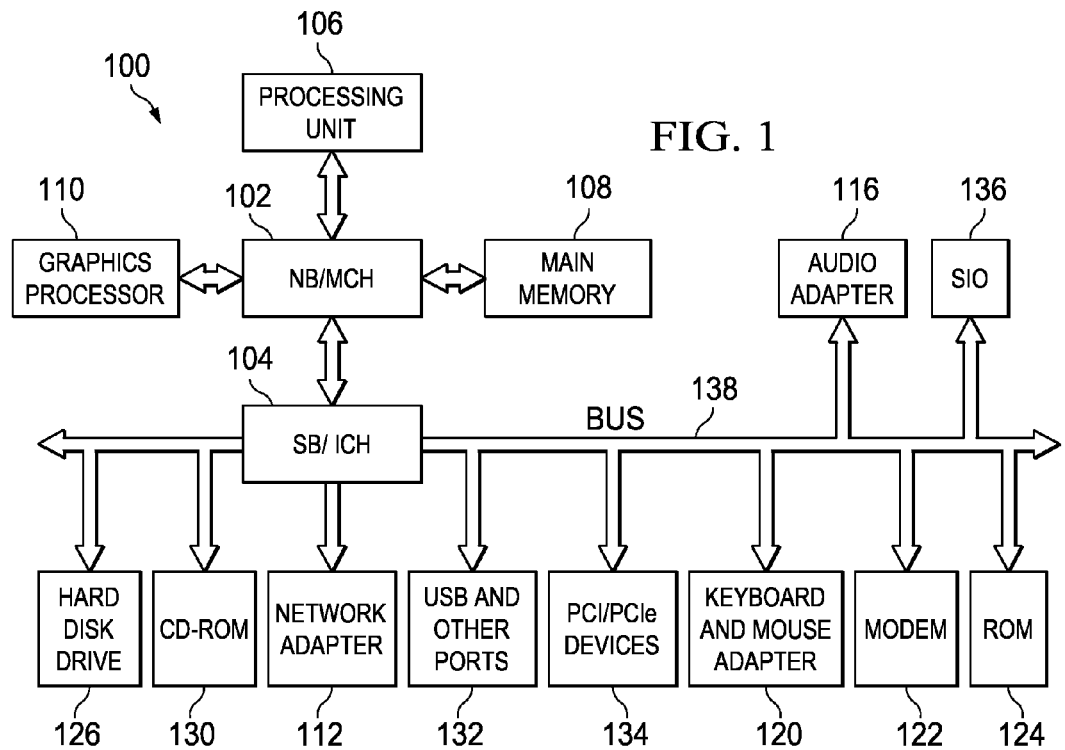
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The aspects of the illustrative embodiments provide a computer implemented method, data processing system, and computer program product for taking advantage of a cascading set of influences of applying a deterministic function to (control data) in a stack frame. By relying on multiple stack frames as inputs to hashing functions, illustrative embodiments may increase the work needed to corrupt a program undetectably.

Figure 2:
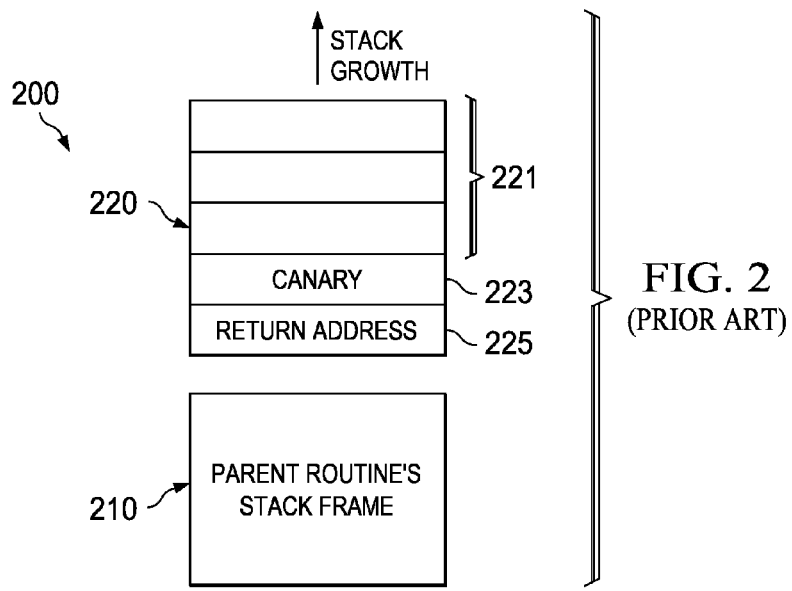
FIG. 2 shows a structure of a stack frame of the prior art.

FIG. 2 shows a structure of a stack frame of the prior art. In FIG. 2, stack growth occurs by adding or pushing a stack above the top stack frame 220. A parent routine is any prior stack frame that was pushed onto the stack before the current stack frame and remains on the stack at the time the current stack frame is pushed onto the stack.

Figure 3:
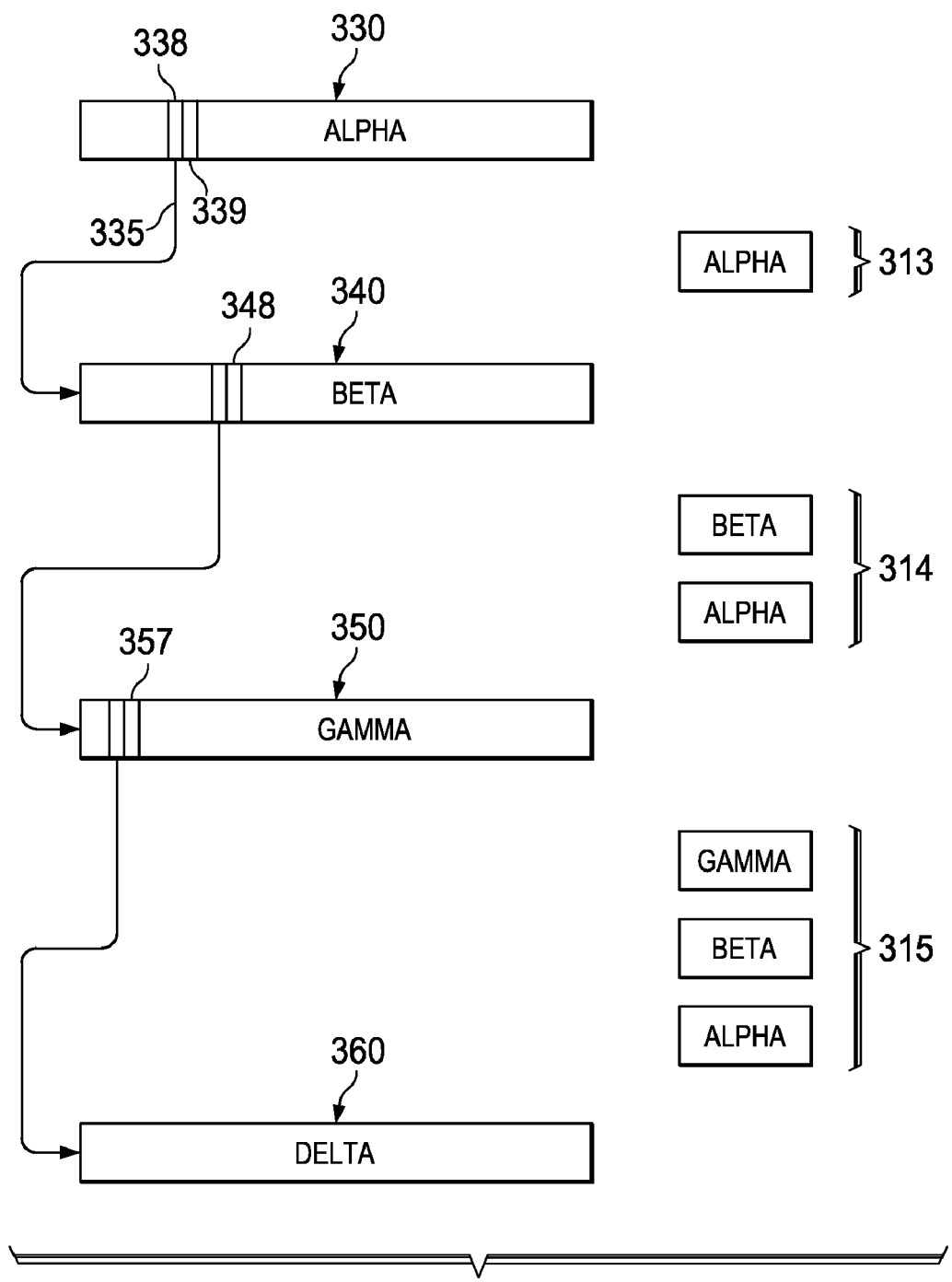
FIG. 3 shows the relationship between calling functions or routines, the stack, and called functions in accordance with an illustrative embodiment of the invention.

FIG. 3 shows the relationship between calling functions or routines, the stack, and called functions in accordance with an illustrative embodiment of the invention. A routine is a block of modular computer code. Code is comprised of instructions. An instruction is a smallest unit of machine interpretable information that transforms data within a data processing system. A computer transforms data by storing data, deleting data, and moving data, among other things. A "no operation" is an instruction, in that the instruction instructs the data processing system to advance a current instruction pointer to a next memory location. The routines may occupy distinct areas of memory.

Routine alpha 330 may execute to instruction 338, which may be an instruction to make a function call to instructions in routine beta 340. A function call is an instruction to transfer execution to code or instructions within an area of memory distinct from a routine currently executed by a data processing system. The code is a routine referenced by the function call. The data processing system may push the state of the routine alpha to a stack frame within stack 313. Included with this information may be a return address referencing instruction 339. Instruction 339 is the instruction to be executed upon returning control to the calling program after beta 340, the called program, completes. Nevertheless, corruption of the return address may prevent the correct resumption of instructions in alpha 330.

The instructions of alpha 330 may be machine instructions, for example, assembler language or microcode. Such instructions may be generated as a result of compilation or interpretation of a high-level programming language.

Similarly, beta 340 may call to a routine, gamma 350. Instruction 348 is in a memory for execution following completion of gamma 350. Consequently, the data processing system stores a return address to instruction 348 to a stack frame within stack 314. Stack 314 includes stack frames for the beta routine and the alpha routine and is an extended version of stack 313.

Next, gamma 350 may call to delta 360. Instruction 357 is in a memory for execution following completion of delta 360. Consequently, the data processing system pushes a stack frame on to stack 314 to form stack 315. The new stack frame includes a return address to instruction 357. Stack 315 is an extended version of stack 314. Stack frames may be numbered in consecutive order according to their relative positions in the stack. Thus the alpha stack frame can be numbered 1, the beta stack frame can be numbered 2, and the gamma stack frame can be numbered 3. A stack frame can be referenced by a number 'N'. In addition, the top stack frame can be located based on a stack pointer, which may point to unused memory above the top stack frame.

Figure 4:
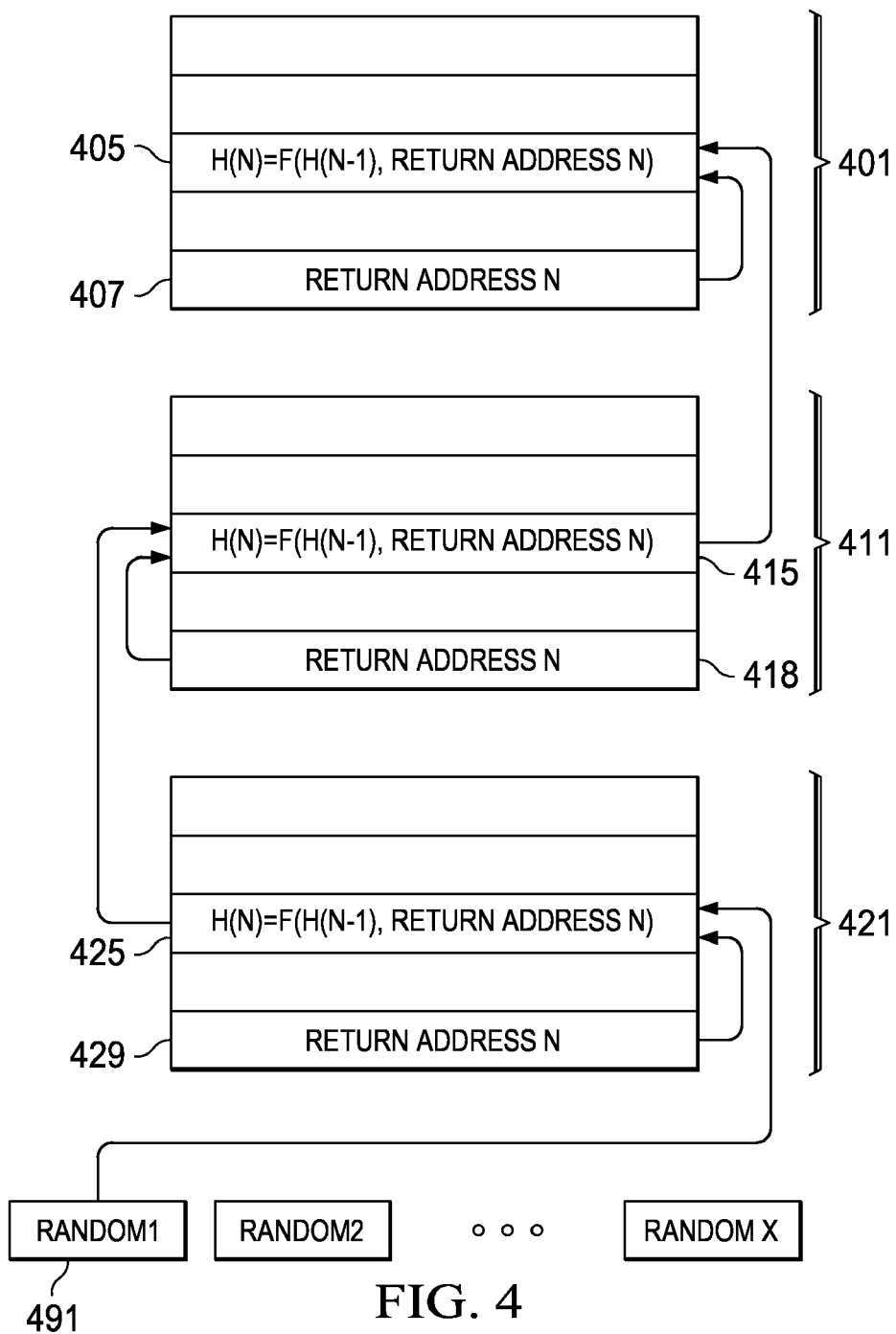
FIG. 4 shows stack frames of a stack in accordance with an illustrative embodiment of the invention.

FIG. 4 shows stack frames of a stack in accordance with an illustrative embodiment of the invention. Each stack frame includes a canary that is formed by applying a hash function to at least two variables to form a hash. The variables may be determined at compile time based on a flag that establishes how many variables a canary generating function is to use. Generally, the variables may be data from the current stack frame and a prior or parent stack frame, for example, control data. Control data is data that indicates instructions concerning which instructions are to be executed at the conclusion of a routine's operation. However, the variables may include random numbers, where, for example, there is no parent routine for an executing set of instructions. In other words, a data processing system may build the first stack frame from a hash function based on two or more random numbers stored to memory.

The number of variables to use may be set at compile time. A software developer may establish a prologue flag, assigning a variable to the number of parent stack frames to use as sources for variables of a hash function used to form the hash or canary of a new stack frame. A prologue flag is the number of parent stack frames referenced in a hash function, as explained further below.

A hash function is an equation that a data processing system may use to calculate a result or hash by applying mathematical operations to one or more input variables such that for an expected set of inputs, few hash collisions occur. In other words, the output set will be comprised of hashes that are unique, or nearly unique in that one hash may uniquely be derived from the input variables used to calculate the hash. Thus, a hash is a number or string that may uniquely identify associated input variables to the hash function. A hash function that is a cryptographic hash function can enhance a difficulty of an attacker to create a false hash that correctly results from using a false or corrupted variable. For this reason, a cryptographic hash function may be used in the illustrative embodiment of FIG. 4. A cryptographic hash function has a property that for a given hash, it is computationally difficult to determine the inputs to the hash function, as compared to other hash functions. A cryptographic hash function has a property that for a given hash, it is computationally difficult to find a second set of inputs that will yield the same hash as applying the hash function to the original inputs or variables. Examples of cryptographic hash functions include Message-Digest algorithm 5 (MD5), and Secure Hash Algorithm (SHA), among others.

FIG. 4 shows an illustrative embodiment that uses a prologue flag set to 1. In other words, based on a prologue flag of 1, when a data processing system creates a hash, the data processing uses an input from the immediate parent stack frame of the current stack frame. For example, stack frame 401 has a return address N 407. An immediate parent stack frame of stack frame 401 is stack frame 411. Control information of stack frame 411 includes canary 415 and return address N 418. The formula to determine the hash to apply for frame 401 can be as follows:

$$H(N)=F(H(N-1), \text{Return Address } N) \quad [1]$$

where N is the top stack frame number, for example, 3. H(N−1) represents the hash associated with a parent stack frame. Return address N is return address N 407, the return address to be protected in the top stack frame. H(N−1) and return address N are variables to the hash function for stack frame N. The resultant hash, H(N), is the hash associated with the top stack frame. The variables, H(N−1) and return address N, are stored to variable locations, in this case, within stack frame 2 411 and stack frame 3 401, respectively.

If desired, a more robust hash function can be used. For example, a bash function applicable to a prologue flag set to 2 can be:

$$H(N)=F(H(N=2), H(N-1), \text{Return Address } N) \quad [2]$$

Thus, the number of variables used from parent stack frames may correspond to the prologue flag. In instances where there are insufficient parent stack frames to satisfy the input hash variables to H(N), a random number may be used as a proxy for the parent stack frames, for example, random 1 491 as related to the canary or hash 425. Stack frame 1 421 has N=1. Consequently, for a prologue flag of 1, random1 491 is substituted for H(O) when using equation 1, as described above.

Figure 5:
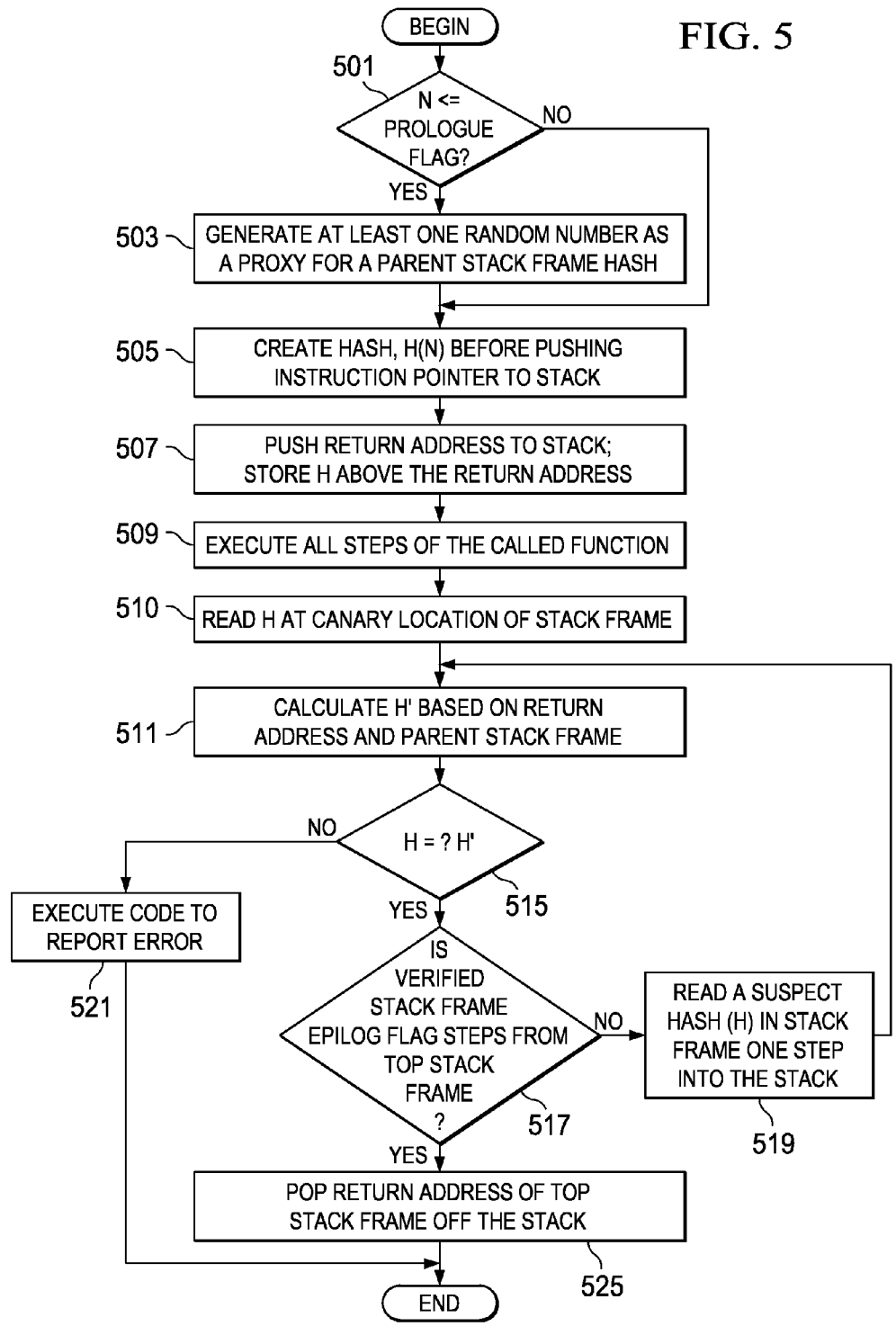
FIG. 5 is a flowchart of steps in accordance with an illustrative embodiment of the invention.

FIG. 5 is a flowchart of steps in accordance with an illustrative embodiment of the invention. The data processing system performs the steps of FIG. 5 when a function call occurs and an Nth stack frame is to be constructed and pushed onto the stack. Initially, the data processing system determines whether the stack frame under construction, denoted by N, is less than or equal to the prologue flag (step 501). A positive result to step 501 causes the data processing system to generate at least one random number as a proxy for a parent stack frame hash (step 503). On the other hand, a negative result to step 501 causes the data processing system to create a hash from one or more parent stack frames (step 505) in accordance with the prologue flag described above. The parent stack frames are parent stack frames in relation to the Nth stack frame.

Next, the data processing system pushes the return address to the stack and pushes the hash above the return address (step 507). By "above," it is meant that the hash address is placed in the direction of stack growth in relation to the return address. One or more memory locations above the return address can be a canary location. A canary location is a memory location between a return address and data structure portions of a stack frame. Attendant with step 507, the data processing system may create a data structure above the return address so that the data processing system may perform the data operations of the called function. Next, the data processing system may execute all the steps of the called function (step 509). Ordinary execution of the steps of the function may include receiving a buffer overflow attack. At this point, the value stored in the canary location may not be correct. A suspect hash is a value stored in a canary location after executing instructions of the called function. A verification hash (H') is a value calculated using a hash function and variables of a hash function applicable to the canary location following substantially all the steps of a called function.

Next, the data processing system reads a suspect hash (H) at the canary location of the stack frame (step 510). Next, the data processing system calculates a verification hash based on the return address and the parent stack frame (step 511). The data processing system compares the suspect hash with the verification hash (step 515). A negative result to step 515 leads to the data processing system reporting an error (step 521). Processing terminates thereafter.

At this point, the return address can be trusted to be correct to the extent to which the variables are uncorrupted. That is, the data processing system has formed a positive determination with respect to the suspect hash (H) matching the verification hash (H'). To provide an added level of assurance, the data processing system may verify one or more of the variables applied to the verification hash. If the data processing system is executing code associated with an epilog flag greater than 1, the data processing system may further test suspect hashes in parent stack frames. A positive result to step 515 causes the data processing system to determine if the stack frame number of the verified stack frame is epilog flag steps from the top stack frame (step 517). An epilog flag is a number of iterations that a data processing system may verify data of successively older generations of parent stack frames. Thus, for example, an epilog flag of 2 applied to the stack of FIG. 4, will permit a data processing system to verify hash 405, hash 415, and hash 425 of stack frame 3, stack frame 2, and stack frame 1, respectively. Following each successful verification, each hash is associated with the verified stack frame applied in each iteration of step 517. Thus, when stack frame 1 is verified, and the top stack frame is 3, the verified stack frame is 2 steps from the top stack frame.

Returning to FIG. 5, if the verified stack frame is an epilog flag step from the top stack frame, the data processing system pops the return address of the top stack frame off the stack (step 525). Otherwise, the data processing system reads a suspect hash (H) one step into the stack (step 519). An epilog flag is may be set at compile time. Thus, for example, an absence of an epilog flag causes the data processing system to verify a single return address at step 515. As a second example, an epilog flag of 1 causes the data processing system to read one suspect hash at step 519. Accordingly, execution of step 519 may result in calculating a second verification hash, and confirming a suspect hash of a parent stack frame. Consequently, the data processing system may form a second positive determination with respect to the suspect hash of a parent stack frame matching the verification hash of a parent stack frame. Moreover, the improved assurance that the parent stack frame has a verified hash, improves the assurance that the verification of the first suspect hash is correct. Such a tiered approach to verifying the basis of an initial verification can detect whether, for example, a first suspect hash is corrupted by a combined revision to suspect hash 405, return address 407, suspect hash 415 of FIG. 4.

The illustrative embodiments permits a data processing system to recursively verify suspect hashes used to protect one or more return addresses. By relying on data within at least two stack frames, the data processing system introduces greater complexities to an attacker that attempts to smash a stack by overwriting a buffer. At a minimum, the attacker cannot revise a return address without employing a correct hash function dependent on at least four memory locations in the stack (407, 415, 418, 425).

It is appreciated that some stacks may grow in the direction of smaller memory addresses, and that the direction of growth is implementation dependent. Consequently, usage of the terms, "above" and "below" with respect to the stack are with reference to the direction of stack growth, and not with respect to memory addresses.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for verifying a return address, the method comprising:

a) storing the return address into a stack based on a function call;

b) generating a first hash based on a first stack frame and a second stack frame;

c) storing the first hash in a first canary location, wherein the first canary location is in the first stack frame;

d) executing at least one instruction of a routine referenced by the function call;

e) reading the first canary location to form a first suspect hash;

f) calculating a first verification hash based on the first stack frame and the second stack frame;

g) determining that the first verification hash matches the first suspect hash to form a first positive determination;

h) responsive to the first positive determination, reading a second canary location to form a second suspect hash;

i) calculating a second verification hash based on the second stack frame;

j) determining that the second verification hash matches the second suspect hash to form a second positive determination;

k) responsive to the first positive determination and the second positive determination, popping the return address off the stack; and l) executing at least one instruction at a memory location pointed to by the return address.

2. The computer implemented method of claim 1, wherein the second stack frame is an epilog flag different than the first stack frame, wherein the epilog flag is set at compile time.

3. The computer implemented method of claim 1, wherein storing the first hash comprises storing the return address into the first stack frame.

4. The computer implemented method of claim 1, wherein storing the first hash comprises storing the return address to a third stack frame, wherein the third stack frame is a top stack frame.

5. The computer implemented method of claim 1, wherein generating further comprises generating the first hash based on a hash of the first stack frame and a hash of the second stack frame.

6. The computer implemented method of claim 5, wherein the hash of the second stack frame is based on a hash of a stack frame of a parent routine of a routine associated with the second stack frame.

7. The computer implemented method of claim 6, wherein the first hash comprises storing the return address to a top stack frame, the parent routine is a prologue flag different than the top stack frame, and the prologue flag is at least one.

8. A data processing system comprising:
a bus;
a storage device connected to the bus, wherein computer usable code is located in the storage device;
a communication unit connected to the bus;
a processing unit connected to the bus, wherein the processing unit executes the computer usable code for verifying a return address, the processing unit further executes the computer usable code to store the return address into a stack based on a function call; generate a first hash based on a first stack frame and a second stack frame; store the first hash in a first canary location, wherein the first canary location is in the first stack frame; execute at least one instruction of a routine referenced by the function call; read the first canary location to form a first suspect hash; calculate a first verification hash based on the first stack frame and the second stack frame; determine that the first verification hash matches the first suspect hash to form a first positive determination; responsive to the first positive determination, read a second canary location to form a second suspect hash; calculate a second verification hash based on the second stack frame; determine that the second verification hash matches the second suspect hash to form a second positive determination; responsive to the first positive determination and the second positive determination, pop the return address off the stack; and execute at least one instruction at a memory location pointed to by the return address.

9. The data processing system of claim 8, wherein the second stack frame is an epilog flag different than the first stack frame, wherein the epilog flag is set at compile time.

10. The data processing system of claim 8, wherein in executing the computer usable code to store the first hash, the data processing system stores the return address into the first stack frame.

11. The data processing system of claim 8, wherein in executing the computer usable code to store the first hash, the data processing system stores the return address to a third stack frame, wherein the third stack frame is a top stack frame.

12. The data processing system of claim 8, wherein in executing the computer usable code to generate, the data processing system generates the first hash based on a hash of the first stack frame and a hash of the second stack frame.

13. The data processing system of claim 12, wherein the hash of the second stack frame is based on a hash of a stack frame of a parent routine of a routine associated with the second stack frame.

14. The data processing system of claim 13, wherein the first hash comprises storing the return address to a top stack frame, the parent routine is a prologue flag different than the top stack frame, and the prologue flag is at least one.

15. A computer program product the computer program product comprising:
a computer-readable tangible storage device having computer usable program code for verifying a return address, said computer program product including:
computer usable program code for storing the return address into a stack based on a function call;
computer usable program code for generating a first hash based on a first stack frame and a second stack frame;
computer usable program code for storing the first hash in a first canary location, wherein the first canary location is in the first stack frame;
computer usable program code for executing at least one instruction of a routine referenced by the function call;
computer usable program code for reading the first canary location to form a first suspect hash;
computer usable program code for calculating a first verification hash based on the first stack frame and the second stack frame;
computer usable program code for determining that the first verification hash matches the first suspect hash to form a first positive determination;
computer usable program code for responsive to the first positive determination, reading a second canary location to form a second suspect hash;
computer usable program code for calculating a second verification hash based on the second stack frame;
computer usable program code for determining that the second verification hash matches the second suspect hash to form a second positive determination;

computer usable program code for responsive to the first positive determination and the second positive determination, popping the return address off the stack; and computer usable program code for executing at least one instruction at a memory location pointed to by the return address.

16. The computer program product of claim 15, wherein the second stack frame is an epilog flag different than the first stack frame, wherein the epilog flag is set at compile time.

17. The computer program product of claim 15, wherein the computer usable program code for storing the first hash comprises computer usable program code for storing the return address into the first stack frame.

18. The computer program product of claim 15, wherein the computer usable program code for storing the first hash comprises computer usable program code for storing the return address to a third stack frame, wherein the third stack frame is a top stack frame.

19. The computer program product of claim 15, wherein computer usable program code for generating further comprises computer usable program code for generating the first hash based on a hash of the first stack frame and a hash of the second stack frame.

20. The computer program product of claim 19, wherein the hash of the second stack frame is based on a hash of a stack frame of a parent routine of a routine associated with the second stack frame.

* * * * *